(12) United States Patent
Dandekar et al.

(10) Patent No.: US 9,640,177 B2
(45) Date of Patent: May 2, 2017

(54) METHOD AND APPARATUS TO EXTRAPOLATE SARCASM AND IRONY USING MULTI-DIMENSIONAL MACHINE LEARNING BASED LINGUISTIC ANALYSIS

(71) Applicant: Dell Software, Inc., Round Rock, TX (US)

(72) Inventors: Shree A. Dandekar, Cedar Park, TX (US); Mark W. Davis, Tracy, CA (US)

(73) Assignee: Quest Software Inc., Aliso Viejo, CA (US)

( * ) Notice: Subject to any disclaimer, the term of this patent is extended or adjusted under 35 U.S.C. 154(b) by 0 days.

(21) Appl. No.: 14/726,971

(22) Filed: Jun. 1, 2015

(65) Prior Publication Data
US 2016/0351187 A1   Dec. 1, 2016

(51) Int. Cl.
| G10L 15/00 | (2013.01) |
| G10L 15/07 | (2013.01) |
| G10L 15/18 | (2013.01) |
| G10L 15/06 | (2013.01) |
| G10L 15/22 | (2006.01) |

(52) U.S. Cl.
CPC ........ *G10L 15/075* (2013.01); *G10L 15/1815* (2013.01); *G10L 2015/0633* (2013.01); *G10L 2015/226* (2013.01)

(58) Field of Classification Search
CPC .............. G10L 15/075; G10L 15/1815; G10L 2015/0633; G10L 2015/226
See application file for complete search history.

(56) References Cited

U.S. PATENT DOCUMENTS

| 6,064,383 | A  | 5/2000  | Skelly |
| 7,392,229 | B2 | 6/2008  | Harris et al. |
| 7,487,131 | B2 | 2/2009  | Harris et al. |
| 7,853,863 | B2 | 12/2010 | Sakai |
| 7,970,808 | B2 | 6/2011  | Konig et al. |
| 8,566,088 | B2 | 10/2013 | Pinson et al. |
| 8,767,948 | B1 | 7/2014  | Riahi et al. |

(Continued)

OTHER PUBLICATIONS

Elena Filatova, Irony and Sarcasm: Corpus Generation and Analysis Using Crowdsourcing, Proceedings of the Eighth International Conference on Language Resources and Evaluation (LREC) May 2012 http://www.lrec-conf.org/proceedings/lrec2012/pdf/661_Paper.pdf.

(Continued)

*Primary Examiner* — Qian Yang
(74) *Attorney, Agent, or Firm* — Terrile, Cannatti, Chambers & Holland, LLP; Stephen A. Terrile

(57) ABSTRACT

A system, method, and computer-readable medium for performing ambiguous utterances identification operations by extrapolating statements of the utterance using machine learning based linguistic analysis. More specifically, in certain embodiments, the ambiguous utterances identification operations are performed by generating an ambiguous utterance repository that is indexed by and contains individuals, regions, tweets, blogs, and latest trends. This ambiguous utterance repository is then linked to a lexicon engine that stores linguistic semantics for particular demographics. The ambiguous utterances identification operations also can capture the latest trends in ambiguous utterances occurring happening in certain demographics.

15 Claims, 3 Drawing Sheets

(56) References Cited

U.S. PATENT DOCUMENTS

| | | |
|---|---|---|
| 8,918,320 B2 | 12/2014 | Adler et al. |
| 8,930,187 B2 | 1/2015 | Kiss et al. |
| 2005/0065980 A1* | 3/2005 | Hyatt ............... G06F 17/30604 |

OTHER PUBLICATIONS

Dmitry Davidov et al., Semi-Supervised Recognition of Sarcastic Sentences in Twitter and Amazon, Proceedings of the Fourteenth Conference on Computational Natural Language Learning, pp. 107-116, Uppsala, Sweden, Jul. 15-16, 2010.

* cited by examiner

METHOD AND APPARATUS TO EXTRAPOLATE SARCASM AND IRONY USING MULTI-DIMENSIONAL MACHINE LEARNING BASED LINGUISTIC ANALYSIS

BACKGROUND OF THE INVENTION

Field of the Invention

The present invention relates to information handling systems. More specifically, embodiments of the invention relate to extrapolating sarcasm or irony using machine learning based linguistic analysis.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An ambiguous utterance may be defined as an utterance that has uncertain meaning in the context it appears. Ambiguous utterances include sarcastic utterances and ironic utterances. Although there are other types of ambiguity like generality, indexicality, polysemy, or vagueness, the present disclosure is mainly concerned with sarcasm and irony. A sarcasm utterance may be defined as a sharp, bitter, mocking, or cutting expression or remark; a bitter gibe or taunt. Sarcasm may employ ambivalence, although sarcasm is not necessarily ironic. One aspect of sarcasm is that sarcasm is present in the spoken word and manifested chiefly by vocal inflections. The sarcastic content of a statement often depends upon the context in which it appears. Ironic utterances may be defined as utterances that in their surface form convey the opposite of their intended meaning. Some ironic utterances may also be sarcasm utterances.

Identifying ambiguous utterances is often important to providing accurate interpretation of a text or spoken passage. Accordingly, doing so is a common prerequisite for performing more complex Natural Language Processing (NLP) processing tasks. However, it is challenging to automatically detect ambiguous utterances. One reason for this difficulty is an absence of accurately-labeled naturally occurring utterances that can be used to train machine learning systems. The lack of training corpora is exacerbated by the rapidly-changing nature of language and the constant invention of new forms of utterances derived from slang, loan words, or neologisms. Sarcasm and irony are well studied phenomena in linguistics, psychology and cognitive science. However, in text mining literature, automatic detection of ambiguous utterances is considered a difficult problem. In the context of spoken dialogues, automatic detection of utterances has relied primarily on speech-related cues such as laughter and prosody.

Accordingly, it would be desirable to facilitate the identification of ambiguous utterances including sarcastic utterances and ironic utterances.

SUMMARY OF THE INVENTION

A system, method, and computer-readable medium are disclosed for performing ambiguous utterances identification operations by extrapolating statements of the utterance using machine learning based linguistic analysis. More specifically, in certain embodiments, the ambiguous utterances identification operations are performed by generating an ambiguous utterance repository that is indexed by and contains individuals, regions, tweets, blogs, and latest trends. This ambiguous utterance repository is then linked to a lexicon engine that stores linguistic semantics for particular demographics. The ambiguous utterances identification operations also can capture the latest trends in ambiguous utterances occurring happening in certain demographics. These trends are ranked based on the occurrence and are stored in a Heuristic engine that is responsible for extract ambiguous utterances from the trends using built-in templates. In certain embodiments, the ambiguous utterances include at least one of sarcastic utterances and ironic utterances.

Using machine learning operations these templates are updated substantially in real-time as new information is collected. A decision engine is responsible for mapping the semantic relationships captured by the templates with the built-in lexicon library. The decision engine also includes in-built sentiment analysis capabilities that are used to rank the sentiment for the various templates.

More specifically, in certain embodiments, the ambiguous utterances identification operations use multi-dimensional machine learning, includes representations of linguistics semantics, provides heuristic based extrapolation of the ambiguous utterance, represents relationships between linguistics and demographic trends, represents a plurality of keys, values, and weight indicators relating to trends or relationships of ambiguous utterances, increases sentiment analysis accuracy, assigns social media trends, real-time conversations, business information and other factual indicators to the heuristic operations, assigns a metric value to heuristic indicators that represent a probability or likelihood of their veracity.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
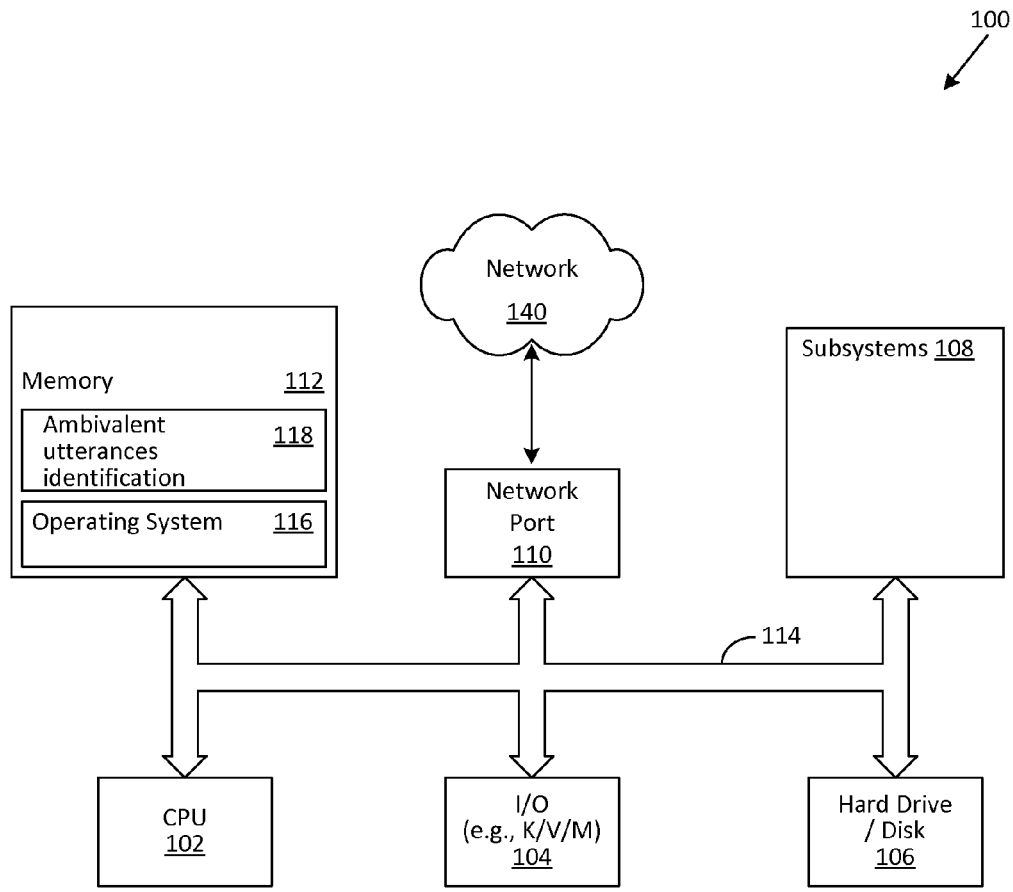
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise an ambiguous utterance identification module 118.

The ambiguous utterance identification module 118 performs ambiguous utterances identification operations by extrapolating statements of an utterance using machine learning based linguistic analysis. Machine learning comprises the use of machine learning operations that can learn from and make predictions on data, which in this case includes linguistic data. The machine learning operations build a model from example inputs to make data driven predictions rather than following strictly static program instructions. More specifically, in certain embodiments, the ambiguous utterances identification operations are performed by generating an ambiguous utterance repository that is indexed by and contains individuals, regions, tweets, blogs, and latest trends. This ambiguous utterance repository is then linked to a lexicon engine that stores linguistic semantics for particular demographics. The ambiguous utterances identification operations also can capture the latest trends in ambiguous utterances occurring happening in certain demographics. These trends are ranked based on the occurrence and are stored in a Heuristic engine that is responsible for extract ambiguous utterances from the trends using built-in templates. In certain embodiments, the ambiguous utterances include at least one of sarcastic utterances and ironic utterances. Using machine learning operations these templates are updated substantially in real-time as new information is collected. A decision engine is responsible for mapping the semantic relationships captured by the templates with the built-in lexicon library. The decision engine also includes in-built sentiment analysis capabilities that are used to rank the sentiment for the various templates.

More specifically, in certain embodiments, the ambiguous utterances identification operations use multi-dimensional machine learning, includes representations of linguistics semantics, provides heuristic based extrapolation of the ambiguous utterance, represents relationships between linguistics and demographic trends, represents a plurality of keys, values, and weight indicators relating to trends or relationships of ambiguous utterances, increases sentiment analysis accuracy, assigns social media trends, real-time conversations, business information and other factual indicators to the heuristic operations, assigns a metric value to heuristic indicators that represent a probability or likelihood of their veracity.

Figure 2:
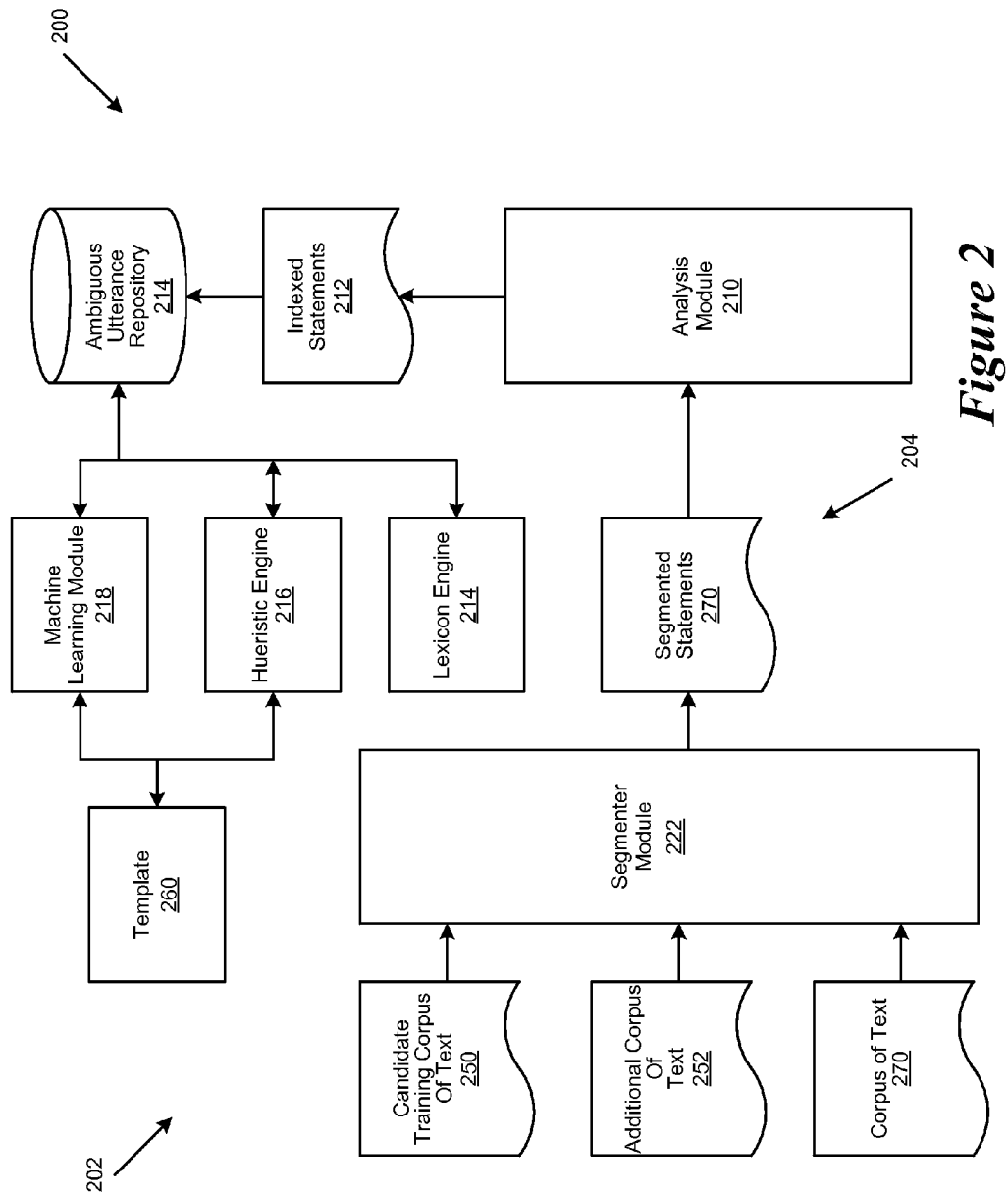
FIG. 2 shows a simplified block diagram of an ambiguous utterance identification system.

FIG. 2 is a simplified block diagram of an ambiguous utterance identification system 200 is implemented in accordance with an embodiment of the invention. The ambiguous utterance identification module 118 includes some or all of the functionality of the ambiguous utterance identification system 200. The ambiguous utterance identification system 200 includes a training portion 202 and an analysis portion 204. The training portion 202 trains the ambiguous utterance identification system to recognize ambiguous statements. The analysis portion 204 identifies ambiguous statements substantially in real time (i.e., with a speed that any delay in identification are indiscernible by a user).

The training portion 202 includes an analysis module 210, an ambiguous utterance repository 212, a lexicon engine 214, a heuristic engine 216, and a machine learning module 218, a decision engine 220, a segmenter module 222. The identification portion includes the analysis module 210, the ambiguous utterance repository 214 and the segmenter module 222.

In various embodiments, a training corpus of text 250 containing ambiguous utterances is analyzed by an analysis module 206 to provide indexed ambiguous utterances 212. The indexed ambiguous utterances are then stored within an ambiguous utterance repository 214. In various embodiments, the ambiguous utterance repository 214 is linked to a lexicon engine 214 that stores linguistic semantics for particular demographics within for example a lexicon library.

One or more additional corpus of text 252 representing trends in ambiguous utterances occurring in certain demographics are also provided to the analysis module 206 which in turn generates additional indexed ambiguous utterances 212 based upon the trends. These trends are ranked by a heuristic engine 216 based on the occurrence and are stored in the ambiguous utterance repository 214 including the ranking of the trends. In certain embodiments, the heuristic engine 216 extracts ambiguous utterances from the trends using templates 260. In certain embodiments, the ambiguous utterances include at least one of sarcastic utterances and ironic utterances.

Additionally, the ambiguous utterance identification system 200 includes a machine learning module 218 which performs machine learning operations to update the templates 260 used by the heuristic engine 220. In certain embodiments, the templates are updated substantially in real-time as new information is collected regarding ambiguous utterances.

Additionally, in certain embodiments, the analysis module 210 includes a decision engine which maps the semantic relationships captured by the templates with a lexicon library stored within the lexicon engine 214. The decision engine also includes sentiment analysis capabilities that are used to rank the sentiment for the various templates.

In various embodiments, the ambiguous utterance identification system 200 is implemented to identify ambiguous utterances contained within an input corpus of text 270. In these and other embodiments, the ambiguous utterance identification system 200 identifies of utterances from various individuals, various regions, various tweets, various blogs as well as any other text generation sources.

In certain embodiments, prior to analysis by the analysis module 210, the training corpus of text 250 is segmented into statements, such as independent clauses, by a segmenter module 222. In various embodiments, the segmenter module 222 is implemented to perform various segmentation operations, such as sentence segmentation, text segmentation, tokenization, or a combination thereof. As used herein, sentence segmentation broadly refers to the process of determining text processing units consisting of one or more words and likewise identifying sentence boundaries between words in different sentences. Those of skill in the art will be aware that most written languages have punctuation marks which occur at sentence boundaries. Accordingly, sentence segmentation is frequently referred to as sentence boundary detection, sentence boundary disambiguation, or sentence boundary recognition. All these terms refer to the same task, which is determining how a corpus of text should be divided into sentences for further processing.

As likewise used herein, text segmentation broadly refers to the task of dividing a corpus of text into linguistically-meaningful units. As used herein, these linguistic units refer to the lowest level characters representing individual graphemes in a language's written system, words consisting of one or more characters, and sentences consisting of one or more words. Skilled practitioners of the art will be aware that it is difficult to successfully perform sentence and word segmentation independent from one another. This segmentation varies by language and language families and includes approximate methods that are applicable to agglutinative and fusional languages. For instance, text segmentation includes using character bigrams as an approximate representation for Chinese when combined with the other methods described herein, as well as phonemic decompositions of other morphologically complex language forms.

In various embodiments, ambiguous utterance identification operations are initiated by first receiving an input corpus of text 250 containing statements to be identified. For example, the input corpus of text 250 may include a paragraph of text, such as, "We went to ACME restaurant last night. The food was awesome. We were up all night with food poisoning. The service was out of this world. It took us forever to receive our meals. When asked why the burgers took so long, the server condescendingly told us there is only so much room on the grill. We would not recommend ACME to anyone." Once the input corpus of text 250 has been received, it is then segmented into statements 270 by the segmenter module 222, as described in greater detail herein. To continue the example, the resulting segmented statements may include "We went to ACME restaurant last night," "The food was awesome," "We were up all night with food poisoning," "The services was out of this world," "It took us forever to receive our meals," "When asked why the burgers took so long, the server condescendingly told us there is only so much room on the grill," "We would not recommend ACME to anyone."

Additionally, in certain embodiments, the input corpus of text can be accompanied by (or include) other non-text information related to the text. For example the non-text information not related to the text might include a rating. Continuing this example, the rating might be a rating of one on a scale of five. Such a low rating provides an additional indication that certain of the statements within the corpus were either sarcastic or ironic statements.

In turn, the analysis module 210 processes the segmented statements 270, as described in greater detail herein, to determine whether any of the statements could be identified as ambiguous statements. Continuing the example, the second and fourth segmented statements are classified as being unambiguous. However, the first, third, fifth and sixth segmented statements are classified as unambiguous statements, as they are either simply reporting facts like the first, third and fifth, or they are reporting unambiguous impressions of the attitudes of others (sixth). The meaning of the sixth statement is further enhanced by confirming evidence from the preceding statements about the slow service.

In various embodiments, the segmented statements 270 are processed by a Natural Language Processing (NLP) system, familiar to those of skill in the art, to perform part-of-speech tagging and syntactic predicate-argument analysis. This analysis connects predicates and their arguments into semantic frames. As a result of this analysis process, a list of classified statements to be analyzed is produced, along with associated NLP analysis-derived information, which can then be provided to downstream processes, such as the analysis module 210 as well as the machine learning module 218, heuristic engine 216 and lexicon engine 214. The design and operation of such downstream processes or factual verification systems are a matter of design choice.

Figure 3:
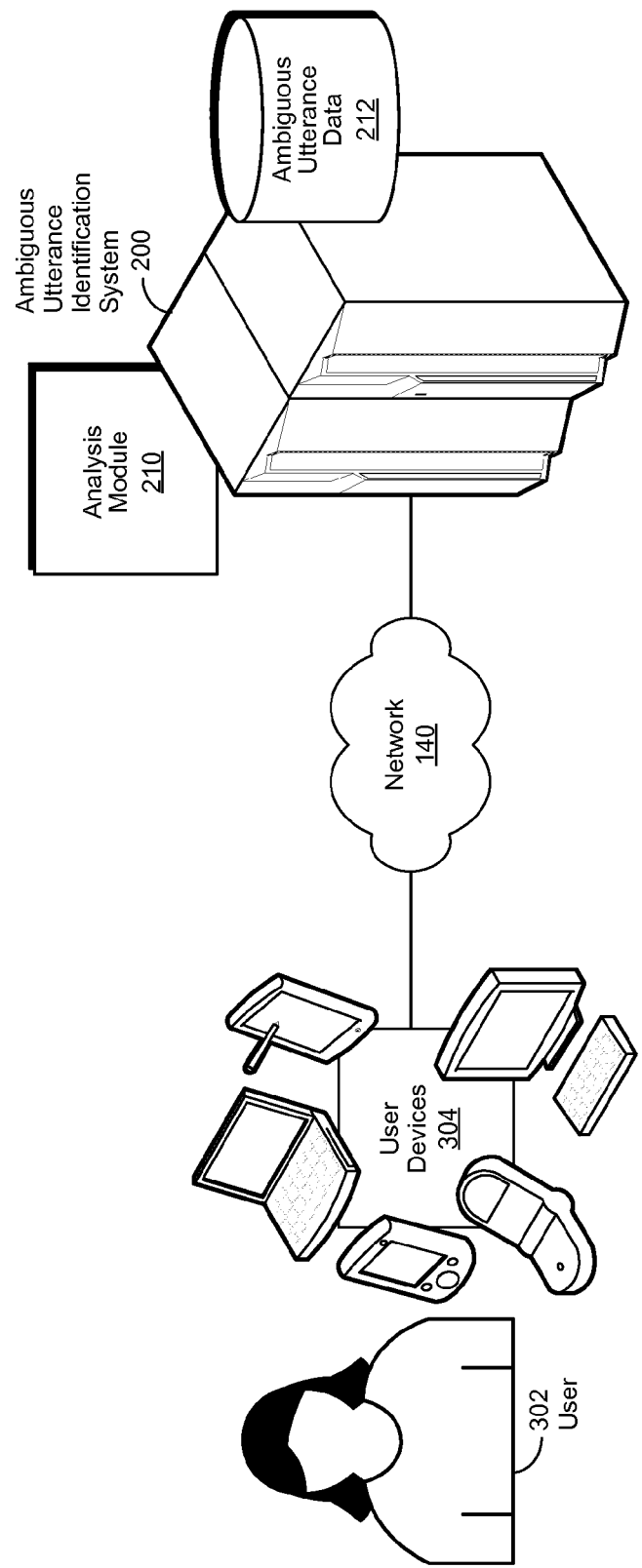
FIG. 3 shows a simplified block diagram of an ambiguous utterance identification environment.

FIG. 3 is a simplified block diagram of an ambiguous utterance identification environment 300. The ambiguous utterance identification environment 300 includes an ambiguous utterance identification system 200 executing on an information handling system. The ambiguous utterance identification system 200 identifies ambiguous utterances that may be generated by a user 302 via a user device 304.

A user 302 uses a user device 304 to generate an utterance (which may be a verbal or textual utterance) which is provided to the ambiguous utterance identification system 200 via a network 140. As used herein, a user device 304 refers to an information processing system such as a personal computer, a laptop computer, a tablet computer, a personal digital assistant (PDA), a smart phone, a mobile telephone, or other device that is capable of communicating and processing data. In various embodiments, the user device 304 is used to exchange information between the user 302 and the system 200 through the use of a network 140.

In various embodiments, the network 140 may be a public network, such as the Internet, a physical private network, a virtual private network (VPN), or any combination thereof. In certain embodiments, the network 140 may be a wireless network, including a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA).

Other embodiments may include the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies. Skilled practitioners of the art will realize that many such embodiments are possible and the foregoing is not intended to limit the spirit, scope or intent of the invention.

Other variations of the ambiguous utterance identification environment 300 are contemplated. For example, the semantic engine and/or the heuristic engine may be included within an analytics suite of applications s. Additionally, the data captured regarding information such as demographics can be stored within a scalable big data platform such as the Hadoop big data platform.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing an ambiguous utterance identification operation, comprising:
   receiving a plurality of ambiguous utterances, each of the plurality of ambiguous utterances comprising an utterance that has an uncertain meaning in a context the utterance appears;
   indexing the plurality of ambiguous utterances to provide a plurality of indexed ambiguous utterances;
   storing the plurality of indexed ambiguous utterances in an ambiguous utterance repository;
   identifying a statement as an ambiguous utterance using machine learning based linguistic analysis and the ambiguous utterance repository;
   storing linguistic semantics for particular demographics within a lexicon engine; and,
   linking the ambiguous utterance repository to the lexicon engine.

2. The method of claim 1, wherein:
   the plurality of ambiguous utterances are indexed by individuals, regions, tweets, blogs, and trends.

3. The method of claim 1, further comprising:
   capturing trends in ambiguous utterances occurring in certain demographics; and, storing information relating to the trends in ambiguous utterances occurring in certain demographics within the ambiguous utterance repository.

4. The method of claim 3, further comprising:
ranking the trends in ambiguous utterances occurring in certain demographics based on the occurrence.

5. The method of claim 4, further comprising:
storing the ranking in a heuristic engine;
extracting ambiguous utterances from the trends using templates.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
receiving a plurality of ambiguous utterances, each of the plurality of ambiguous utterances comprising an utterance that has an uncertain meaning in a context the utterance appears;
indexing the plurality of ambiguous utterances to provide a plurality of indexed ambiguous utterances;
storing the plurality of indexed ambiguous utterances in an ambiguous utterance repository;
identifying a statement as an ambiguous utterance using machine learning based linguistic analysis and the ambiguous utterance repository;
storing linguistic semantics for particular demographics within a lexicon engine; and,
linking the ambiguous utterance repository to the lexicon engine.

7. The system of claim 6, wherein
the plurality of ambiguous utterances are indexed by individuals, regions, tweets, blogs, and trends.

8. The system of claim 7, wherein the instructions executable by the processor are further configured for:
storing linguistic semantics for particular demographics within a lexicon engine; and,
linking the ambiguous utterance repository to the lexicon engine.

9. The system of claim 6, wherein the instructions executable by the processor are further configured for:
ranking the trends in ambiguous utterances occurring in certain demographics based on the occurrence.

10. The system of claim 9, wherein the instructions executable by the processor are further configured for:
storing the ranking in a heuristic engine;
extracting ambiguous utterances from the trends using templates.

11. A non-transitory, computer-readable storage medium embodying computer program code, the computer program code comprising computer executable instructions configured for:
receiving a plurality of ambiguous utterances, each of the plurality of ambiguous utterances comprising an utterance that has an uncertain meaning in a context the utterance appears;
indexing the plurality of ambiguous utterances to provide a plurality of indexed ambiguous utterances;
storing the plurality of indexed ambiguous utterances in an ambiguous utterance repository; and,
identifying a statement as an ambiguous utterance using machine learning based linguistic analysis and the ambiguous utterance repository;
storing linguistic semantics for particular demographics within a lexicon engine; and,
linking the ambiguous utterance repository to the lexicon engine.

12. The non-transitory, computer-readable storage medium of claim 11, wherein
the plurality of ambiguous utterances are indexed by individuals, regions, tweets, blogs, and trends.

13. The non-transitory, computer-readable storage medium of claim 12, wherein the computer executable instructions are further configured for:
storing linguistic semantics for particular demographics within a lexicon engine; and,
linking the ambiguous utterance repository to the lexicon engine.

14. The non-transitory, computer-readable storage medium of claim 11, wherein the computer executable instructions are further configured for:
ranking the trends in ambiguous utterances occurring in certain demographics based on the occurrence.

15. The non-transitory, computer-readable storage medium of claim 14, wherein the computer executable instructions are further configured for:
storing the ranking in a heuristic engine;
extracting ambiguous utterances from the trends using templates.

* * * * *